United States Patent [19]
Holland

[11] Patent Number: 4,815,444
[45] Date of Patent: Mar. 28, 1989

[54] MODERATE TO MODERATELY HIGH TEMPERATURE SOLAR LIQUID HEATER

[76] Inventor: Beecher J. Holland, 600 Morison Ave., Kingsport, Tenn. 37660

[21] Appl. No.: 111,185

[22] Filed: Oct. 22, 1987

Related U.S. Application Data

[63] Continuation-in-part of Ser. No. 902,769, Sep. 2, 1986, which is a continuation-in-part of Ser. No. 764,398, Aug. 12, 1985.

[51] Int. Cl.$^4$ .................................................. F24J 2/10
[52] U.S. Cl. .................................... 126/438; 126/417
[58] Field of Search ................ 126/438, 417, 424, 451

[56] References Cited

U.S. PATENT DOCUMENTS

| | | | |
|---|---|---|---|
| 1,162,505 | 11/1915 | Nichols | 126/438 |
| 3,974,824 | 8/1976 | Smith | 126/438 |
| 4,024,852 | 5/1977 | L'Esperance et al. | 126/438 |
| 4,084,578 | 4/1978 | Ishibashi | 126/437 X |

Primary Examiner—Larry Jones

[57] ABSTRACT

The present invention is a solar concentrator trough of wide-angle capability disposed east-west lengthwise in an inverted V shape. The legs of the inverter V include an angle of less than 180 degrees as measured on the underside of the trough. The trough leans at an appropriate angle toward a path of solar traverse so as to function for any desired fraction of the year without adjustment. Heated liquid rises to the high point in the concentrator's absorber conduit and flows by conduit to a reservoir. Higher temperature performance is achieved in part by making minimal adjustments to the angle of lean.

2 Claims, 1 Drawing Sheet

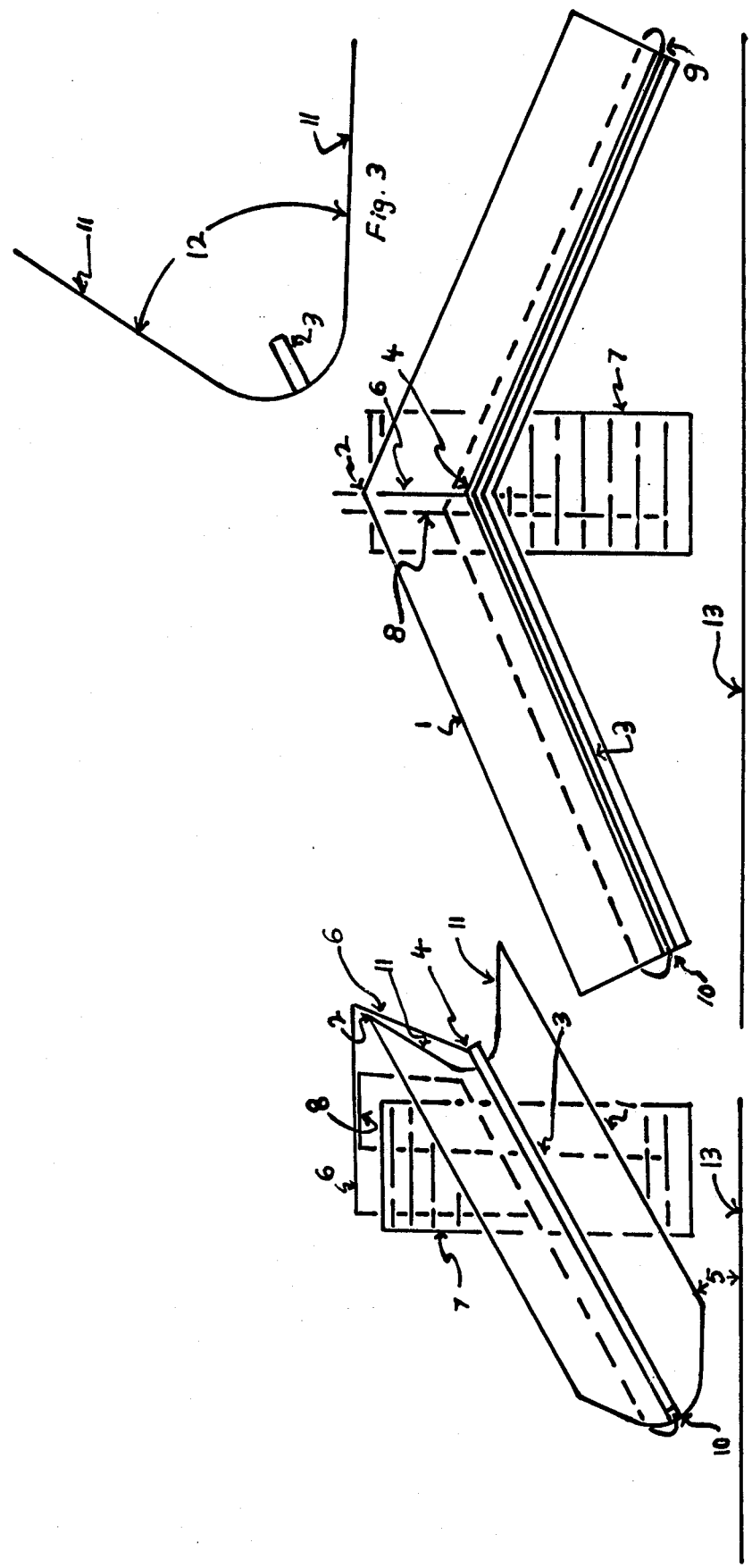

MODERATE TO MODERATELY HIGH TEMPERATURE SOLAR LIQUID HEATER

This application is a continuation-in-part of No. 06/902,679 filed 9-2-86, now abandoned, which is a continuation-in-part of No. 06/764,398, filed 8-12-85, now abandoned.

The present invention, a solar liquid heater, consists of at least one solar concentrator of wide-angle capability after the manner of Holland (see references) with the reflector portion of the solar concentrator being of generally trough-shape cross section wherein the length of the trough extends generally east and west to form essentially an inverted-V shape and which length of the trough includes an angle of less than 180 degrees as measured on the underside of the trough and wherein the trough leans essentially southward when located in the northern hemisphere and essentially northward when located in the southern hemisphere at an angle which is fixed for moderate temperature performance and for performance over some fraction of the year and is adjustable for higher temperature performance and wherein an absorber conduit (the first conduit) set in the cavity formed by the trough and a second conduit communicates with the high point vicinity of the first conduit and a reservoir and wherein a third conduit communicates with the reservoir and the first conduit near the east and west extremities of the first conduit with the second and third conduits reaching essentially the same height prior to entering the reservoir wherein such height is at least as great as the high point of the first conduit.

A working scale model of the present invention is in hand.

German Pat. No. 1476717 (Fed. Rep. of Germany) discloses a related device. However, being parabolic the device would require frequent adjustment. Also, semicircular disposition of the trough lends itself to unproductive heat loss areas near the ens of the semicircular trough duing the central art of the day. Further, the semicircular disposition of a parabolic cross section appears comparatively expensive to manufacture.

U.S. Pat. No. 4,309,079 is related but appears to be more complicated manufacture (because of semicircular disposition and of the cross section of the trough being canted to one side), install and use and suffers from the same unproductive heat loss near the ends of the semicircular trough as mentioned above. The present invention is superior in that adjustment would be much less frequent (may be zero) than with the parabolic device and the present invention offers productivity over its full length during the central portion of the day. Also, the present invention appears more feasible economically than either device above by being simpler to manufacture, install and use. Moreover, the inverted-V has a more obvious absorber high point to which rising liquid will go directly even in the event of some off-level of the trough instead of forming a somewhat stagnant puddle at the top of a semicircular trough. Further, entry of the second and third conduits into the reservoir from essentially the same level largely avoids selfcooling of the reservoir by backward circulation.

Another related device is Belgium Pat. No. 563711 by Bremaecker. It is noted that Bremaecker suffers in comparison to the present invention in that (1) it will not function all day as does the present invention, (2) it does not have a common high point for the collector system hot tubes as does the present invention but rather presents an extensive top portion of collectors and tube (item 8' and 8" of FIG. 5) which creates a large puddle of heated liquid to form a large hot area for radiation loss and additionally so in the event of any off-level of the tops of the collectors, (3) it does not have same-level height of hot and cold tubes prior to entry into the reservoir, as the present invention does, which means it will cool its reservoir by backward circulation in the absence of radiation unless the flow system is valved off manually or automatically, which is not required with the present invention, and (4) it appears to require a reservoir elevated above the collectors which may be present structural support and appearance problems, a requirement the present invention avoids. Bremeacker also appears to be a more expensive system than the present invention, the present one being very simple in regard to tubing requirements and the ease of multi-unit preassembly. Finally, the present invention shoudl be capable of higher temperatures.

An object of the present invention is to provide a simple, economic solar device to function all day, each day throughout the year, while radiation is sufficient, to heat a liquid to moderate to moderately high temperature and put it in storage with zero adjustment for moderate temperature performance and moderate adjustment for moderately high temperature performance. A further objective is that the device by amenable to production as a preassembled unit to be positioned on a suitable foundation.

DETAILED DESCRIPTION

The object, design and functioning of the invention will be clarified hereinafter by an embodiment of the invention described by the specification with reference to the accompanying three drawings for which like item numbers refer to the same items in all three drawings:

FIG. 1 is a side view of the invention with item 1 leaning southward.

FIG. 2 is a side view from south looking northward toward FIG. 1.

FIG. 3 is a cross-sectional view of the item 1 of FIGS. 1 and 2.

An embodiment of the invention is shown by FIGS. 1, 2 and 3 and is a solar concentrator with trough-shape cross section of wide-angle capability like FIG. 3 (in the manner of Holland) disposed generally like an inverted V, FIG. 2. The disposition as shown includes an angle of about 120 degrees as measured on the underside of the trough and between the legs of the inverted V. The trough assembly item 1 leans southward by a fixed angle item 5 measured with respect to the horizontal item 13 such that the high point item 4 of the absorber conduit item 3 aims essentially at the mean solar noon altitude between summer and winter solstices. A conduit item 6 communicates with the high point item 4 of the absorber item 3 and a reservoir item 7 containing a suitable liquid. A conduit item 8 communicates with the reservoir item 7 and the east extremity item 9 and the west extremity item 10 of the absorber. Item 2 is the high point of the trough. The trough and reservoir and parts of the conduits would in practice be insulated and the trough would be covered.

A working scale model of this embodiment is in hand.

Operation of the embodiment may be understood with reference to FIGS. 1 and 2. The morning sun enters the east-facing section of the trough assembly item 1 and heats the absorber item 3 and its liquid content. Expansion of the liquid in the absorber reduces the liquid density and causes it to rise to the absorber high point item 4 and flow through conduit item 6 into the reservoir item 7. Thus, heated liquid has been put in storage without pumping. Note that the west section of the trough assembly is essentially inactive at the moment. As the sun approaches noon position, both east and west sections of the trough assembly contribute heated liquid to the reservoir. Afternoon sun contributes heated liquid from the west section of the trough assembly as did the morning sun from the east section.

Since maximum annual change in solar noon altitude is about 47 degrees, if total angle item 12 of FIG. 3 is equal to or greater than 47 degrees, it is sufficient to encompass the sun's rays in all seasons without adjustment of the angle item 5. It is true, however, that higher temperatures are achievable by making angle item 12 of FIG. 3 smaller and making desired adjustment of angle item 5.

I claim:

1. A solar liquid heater comprises of at least one solar concentrator of wide-angle capability with the reflector portion of the solar concentrator being of generally trough-shape cross section wherein the length of the trough extrends generally east and west to form essentially an inverted V shape and which length of the trough includes an angle of less than 180 degrees as measured on the underside of the trough and wherein the trough leans at an angle which is fixed for moderate temperature performance and for performance over some fraction of the year and is adjustable for higher temperature performance and wherein an absorber conduit, the first conduit, sets in the cavity formed by the trough and a second conduit communicates with the high point vicinity of the first conduit and a reservoir and wherein a third conduit communicates with the reservoir and the first conduit near the east and west extremities of the first conduit.

2. A solar heater as in claim 1, with the second and third conduits reaching essentially the same height prior to entering the reservoir.

* * * * *

UNITED STATES PATENT AND TRADEMARK OFFICE
CERTIFICATE OF CORRECTION

PATENT NO. : 4,815,444
DATED : March 28, 1989
INVENTOR(S) : Beecher J. Holland

It is certified that error appears in the above-identified patent and that said Letters Patent is hereby corrected as shown below:

Abstract, line 3, "The legs of the inverter V" should read -- The legs of the inverted V --.

Column 1, line 24, "set in the" should read -- sets in the --

Column 1, line 40, "near the ens of the" should read -- near the ends of the --.

Column 1, line 45, "complicated manufacture" should read -- complicated to manufacture --.

Column 2, line 13, "which may be" should read --which may--.

Column 2, line 19, "shoudl" should read -- should --.
Column 2, line 40, "Fig. 2 is a side view" should read -- Fig. 2 is a view from south --.

Column 4, line 1, "comprises" should read -- comprised --.

Signed and Sealed this

Twenty-first Day of November, 1989

Attest:

JEFFREY M. SAMUELS

*Attesting Officer*   *Acting Commissioner of Patents and Trademarks*